United States Patent
Silva et al.

(10) Patent No.: US 10,831,749 B2
(45) Date of Patent: Nov. 10, 2020

(54) EXPERT DISCOVERY USING USER QUERY NAVIGATION PATHS

(71) Applicant: International Business Machines Corporation, Armonk, NY (US)

(72) Inventors: Asima Silva, Holden, MA (US); Hernan A. Cunico, Holly Springs, NC (US); Declan Joyce, Gort (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 15/970,854

(22) Filed: May 3, 2018

(65) Prior Publication Data

US 2019/0340280 A1    Nov. 7, 2019

(51) Int. Cl.
*G06F 16/9535* (2019.01)
*G06F 16/2453* (2019.01)
*G06F 16/951* (2019.01)

(52) U.S. Cl.
CPC ........ *G06F 16/2453* (2019.01); *G06F 16/951* (2019.01); *G06F 16/9535* (2019.01)

(58) Field of Classification Search
CPC ........................ G06F 16/9535; G06F 16/3322
See application file for complete search history.

(56) References Cited

U.S. PATENT DOCUMENTS

| | | |
|---|---|---|
| 8,122,021 B2 | 2/2012 | White et al. |
| 8,468,195 B1 | 6/2013 | Gannu et al. |
| 8,538,978 B2 * | 9/2013 | Rakshit ................ G06F 16/954 707/767 |
| 8,601,023 B2 | 12/2013 | Brave et al. |
| 8,886,797 B2 | 11/2014 | Gannu et al. |
| 8,935,274 B1 | 1/2015 | Mihailovici et al. |
| 9,122,744 B2 | 9/2015 | Spivack |
| 9,367,823 B1 | 6/2016 | Mihalik et al. |

(Continued)

OTHER PUBLICATIONS

"IBM Software Services for Collaboration Wiki: IBM Expertise Locator"; retrieved from [www.ibm.com/developerworks/community/wikis/home?lang=en#!/wiki/Wc703e5ad0b7a_4013_b64b_44d93bb50c62/page/IBM%20Expertise%20Locator]; Jul. 31, 2015.

*Primary Examiner* — Apu M Mofiz
*Assistant Examiner* — Sheryl L Holland
(74) *Attorney, Agent, or Firm* — North Shore Patents, P.C.; Michele Liu Baillie

(57) ABSTRACT

A computing device determines that a user submits a query. The computing device tracks proximate web activities to the query by the user, determines a topic of the query, and determines a navigation path of the user from the proximate web activities. The computing device calculates a semantic score for the navigation path and associates the semantic score with the user, the topic, and the navigation path. The computing device calculates a threshold score for the topic using a sampling of semantic scores associated with matching topics in an expertise dataset and determines whether the semantic score meets the threshold score. When the semantic score does not meet the threshold score, the computing device performs one or more predetermined actions. An efficient manner of automatically discovering navigation paths used by experts in specific topics is provided, thus requiring less computing time and resources.

12 Claims, 3 Drawing Sheets

(56) References Cited

U.S. PATENT DOCUMENTS

| | | |
|---|---|---|
| 9,514,435 B2 | 12/2016 | Nguyen |
| 2013/0282698 A1* | 10/2013 | Oztekin ............ G06Q 30/0281 |
| | | 707/722 |
| 2015/0161276 A1* | 6/2015 | Upstill .............. G06F 16/24534 |
| | | 707/708 |
| 2018/0039635 A1 | 2/2018 | Hawkins et al. |

* cited by examiner

EXPERT DISCOVERY USING USER QUERY NAVIGATION PATHS

BACKGROUND

Users spend a great deal of time searching for answers to a question on the web. The efficiency in finding the answer directly impacts user productivity. Experts in the questions' topics presumably would be more efficient when searching for the answers. Although techniques exist for identifying topics of expertise for specific users, the computing time and resources required to find experts in a particular topic can be expensive.

SUMMARY

Disclosed herein is a method for expert discovery using user query navigation paths, and a computer program product and system as specified in the independent claims. Embodiments of the present invention are given in the dependent claims. Embodiments of the present invention can be freely combined with each other if they are not mutually exclusive.

According to an embodiment of the present invention, a computing device determines that a user submits a query. The computing device tracks proximate web activities to the query by the user, determines a topic of the query, and determines a navigation path of the user from the proximate web activities. The computing device calculates a semantic score for the navigation path and associates the semantic score with the user, the topic, and the navigation path. The computing device calculates a threshold score for the topic using a sampling of semantic scores associated with matching topics in an expertise dataset and determines whether the semantic score meets the threshold score. When the semantic score does not meet the threshold score, the computing device performs one or more predetermined actions.

In one aspect of the present invention, the proximate web activities by the user includes one or more web actions by the user that are close in time with an issuance of the query.

In one aspect of the present invention, the calculating of the semantic score includes using a cognitive model with one or more of the following parameters: an expertise of the user derived from a plurality of sources, where the semantic score is adjusted when the user is determined to be an expert in the topic; a number of steps in the navigation path; a relevancy of contents of one or more webpages in the navigation path; ranking of the webpages in the navigation path according to levels of relevancy to the topic; the user's interactions with the webpages in the navigation path; and an amount of time the user spends on the webpages in the navigation path.

In one aspect of the present invention, the calculating of the semantic score further includes determining at least one follow-up query is issued by the user, calculating a second semantic score for a second navigation path for the user from proximate web activities to the follow-up query; and calculating a composite semantic score for the navigation path and the second navigation path.

In one aspect of the present invention, the threshold score represents a level of expertise above which the user is assumed to be an expert in the topic.

In one aspect of the present invention, the predetermined actions comprise one or more of the following: sending a message to the user to connect to another user determined to be an expert in the topic; sending one or more recommendations of webpages based on webpages in topic-relevant navigation paths in the expertise database; and sending one or more recommendations for modifications to the navigation path based on differences with the topic-relevant navigation paths in the expertise databases.

DETAILED DESCRIPTION

Figure 1:
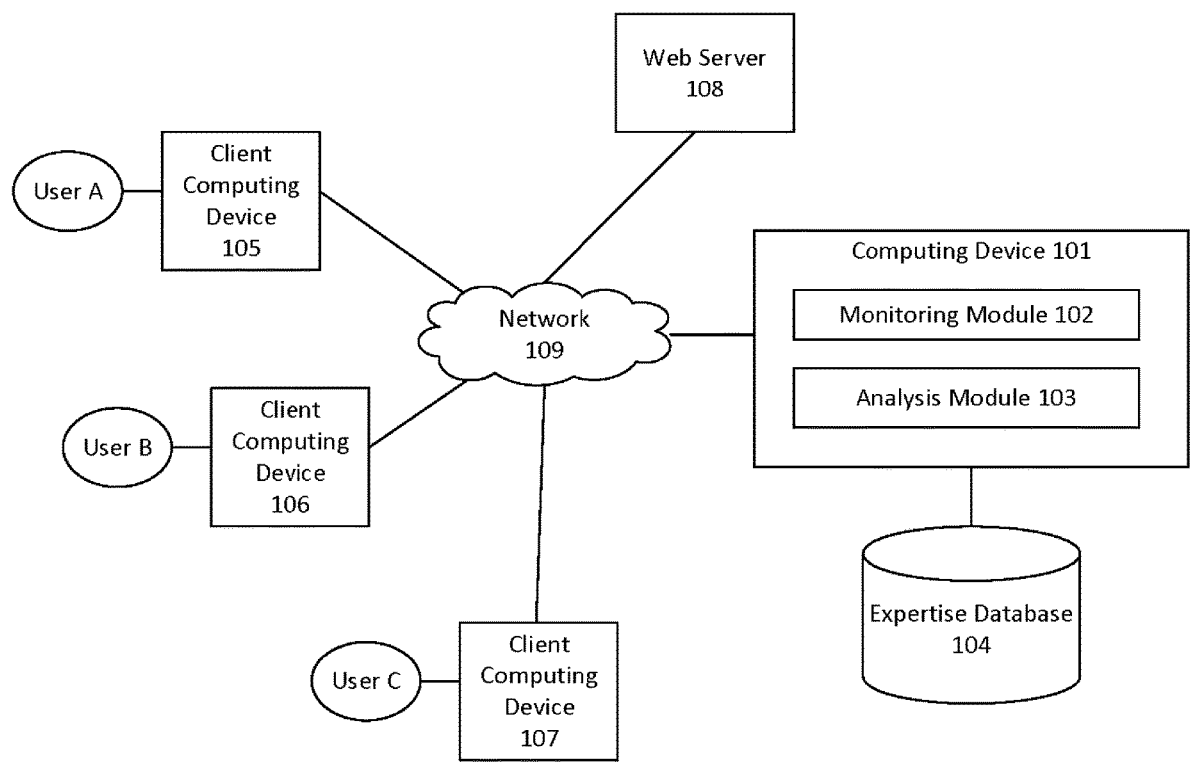
FIG. 1 illustrates a computing environment for embodiments according to the present invention.

FIG. 1 illustrates a computing environment for embodiments according to the present invention. The computing environment comprises a computing device 101 coupled to a plurality of client computing device 105-107 over a network 109, such as the Internet. The client computing device 105-107 and the computing device 101 are coupled to a web server 108 over the network 109. Although one computing device 101 is illustrated, the computing device 101 may be a plurality of computing devices functioning as a single logical computing device 101. Although one web server 108 is illustrated, the web server 108 represents any number of web servers in the network 109, which may be implemented by any number of physical servers (not shown). Users A-C, using their respective client computing devices 105-107, may submit queries to the web server 108 via their client computing devices 105-107 through messages, instant messages, collaboration meetings, etc. According to embodiments of the present invention, the computing device 101 includes a monitoring module 102 capable of intercepting the queries in the message, instant message, collaboration meeting, etc. (e.g. intercepting HTTP requests to the web server 108) issued by a client computing device 105-107 and tracking proximate web activities by Users A-C. Proximate web activities include web activities by Users A-C that are close in time with the issuance of the query and thus are highly likely to be web activities associated with finding an answer to the query. The computing device 101 further includes an analysis module 103 for analyzing the queries and proximate web activities using a cognitive model. Results of the analysis are stored in an expertise database 104. The monitoring module 102 and the analysis module 103 are described further below.

Figure 2:
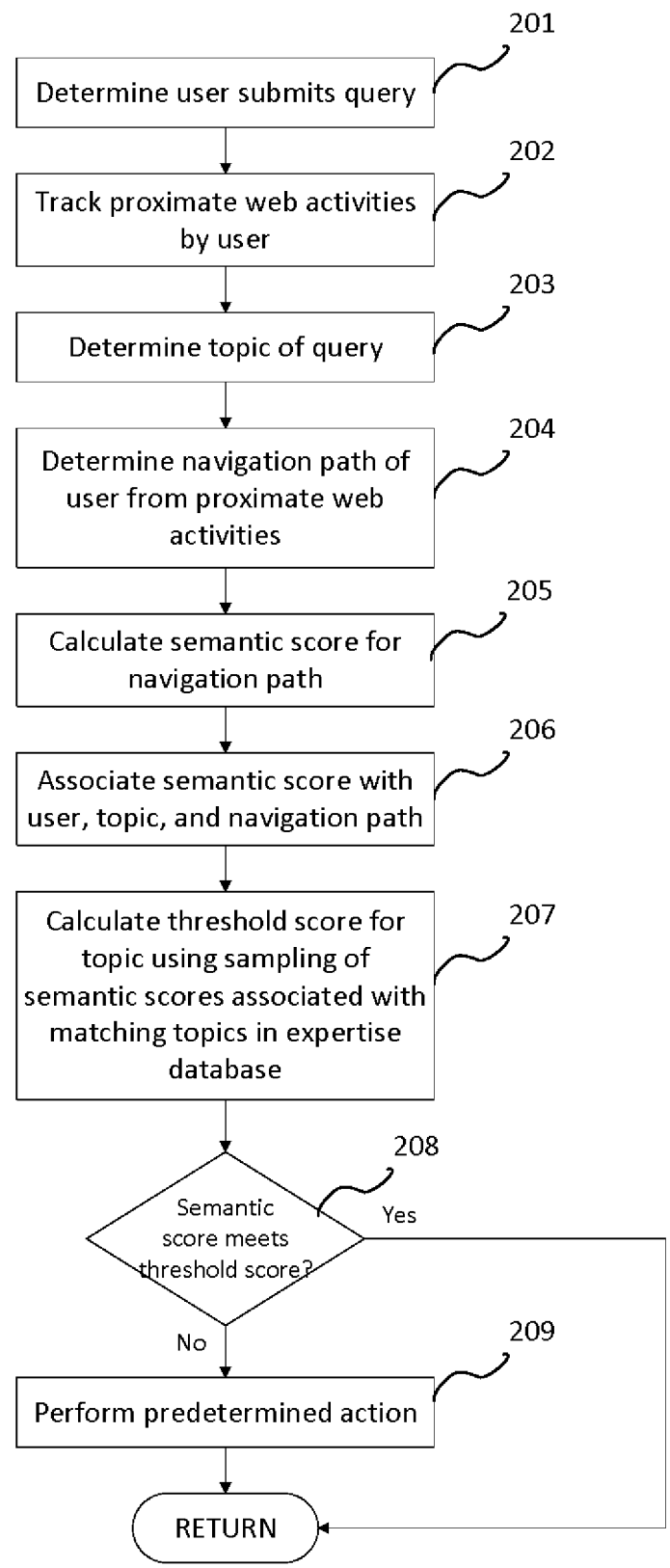
FIG. 2 illustrates an exemplary embodiment of a method for expert discovery using user query navigation paths according to the present invention.

FIG. 2 illustrates an exemplary embodiment of a method for expert discovery using user query navigation paths according to the present invention. The monitoring module 102 determines that a User A, via the corresponding client computing device 105, submits a query (201). This triggers the monitoring module 102 to track the proximate web activities by User A (202). The analysis module 103 determines the topic of the query (203). In determining the topic of the query, the analysis module 103 may use a sematic model to process User A's search string, conversations, chats, messages, instant messages, etc. and identify the topic. The analysis module 103 determines a navigation path of the user from the proximate web activities (204). The proximate web activities include, but are not limited to, an order of webpages that User A visits. The analysis module 103, using a cognitive model, calculates a semantic score for the navigation path (205) and associates the semantic score with User A, the topic, and the navigation path (206). The semantic score and its associated user, topic and navigation path are then stored in the expertise database 104. The calculation of the semantic score is described further below. The analysis module 103 further calculates a threshold score for the topic using a sampling of semantic scores in the expertise database 104 that are associated with matching, or similar, topics (207). Various statistical techniques may be used to calculate the threshold score, such as time series analysis or regression analysis. Other techniques that allows one to find values that veer away from the normal distribution may be used to calculate the threshold score. The analysis module 103 determines whether the semantic score for the navigation path meets the threshold score for the topic (208). Here, the threshold score represents a level of expertise, above which a user may be assumed to be an expert in the related topic. The comparison of the semantic score and the threshold score is in essence comparing the navigation path of User A with the navigation paths of the matching topics in the expertise database 104. When the semantic score for the navigation path of User A does not meet the threshold, one or more predetermined actions may be performed (208). For example, the analysis module 103 may send a message to User A to connect User A with another user who has been determined to be an expert in the topic. For another example, the analysis module 103 may send recommendations of webpages to User A based on the webpages in the topic-relevant navigation paths stored in the expertise database 104, and/or send to User A recommendations for modification to User A's navigation path based on differences with the topic relevant navigation paths in the expertise database 104.

In calculating the semantic score for the navigation path, per block 205, a cognitive model may be used to process any combination of parameters, including but not limited to: the expertise of User A derived from other sources, where the semantic score may be adjusted when User A is determined to be an expert in the topic; number of steps in the navigation path; the relevancy of the content of the webpages in the navigation path; the ranking of the webpages in the navigation path according to level of relevancy to the topic; User A's interaction with the webpages in the navigation path, such as downloading, bookmarking, following links on the webpage, and sharing the webpage; and the amount of time the user spends on the webpages in the navigation path. Other parameters may include any follow-up queries issued by User A, where another semantic score is calculated for the navigation path used with the follow-up query. A composite semantic score may then be calculated for the original query and any follow-up queries. In calculating the threshold score, the level of similarity between the webpages in the navigation path of User A and the navigation paths in the sampling may be used as a parameter.

Once the semantic score for the navigation path is calculated, per block 205, the semantic score may be stored in the expertise database 104 and associated with User A, the topic, and the navigation path. The expertise database 104 may be initially populated by analyzing the navigation paths of known experts in known topics. This initial dataset may also be used as a training dataset for the cognitive model. As more semantic scores are stored in the expertise database 104, the dataset from which the sampling of semantic scores may be obtained also grows. As the dataset grows, the accuracy of the calculation of the threshold score, and thus the determination of the expertise of User A, also grows. Optionally, the semantic score and how the semantic score was obtained may be displayed to User A. User A may then provide feedback on the accuracy of the semantic score, which can then be used to improve the cognitive model.

In an example scenario, assume that the monitoring module 102 intercepts a message from User A with a question, and an instant message from User B with another question to other users (201). In response, the monitoring module 102 tracks the proximate web activities of User A and User B (202). The analysis module 103, using a semantic model, determines that the questions in User A's message and User B's instant message pertain to Topic A (203). From the proximate web activities of User A and User B, the analysis module 103 determines the navigation path of User A and the navigation path of User B, respectively (204). Assume that the following navigation paths are as follows:

User A navigation path: ibm.biz/BwerxDzy-->ibm.biz/B42352-->ibm.biz/B2345-->ibm.biz/Bdx31451Y User B navigation path: ibm.biz/BwerxD45226zy-->ibm.biz/B42365465452

The analysis module 103 calculates a semantic score for the navigation paths of User A and User B (205). Assume that the User A semantic score is "87", and the User B semantic score is "79". The analysis module 103 associates the semantic score of "87" with User A, Topic A, and User A navigation path (206). The analysis module 103 also associates the semantic score of "79" with User B, Topic A, and User B navigation path (206). Each semantic score and its associated data are stored in the expertise database 104. Assume that the monitoring module 102 then intercepts a collaboration meeting from User C with another question to users (201), and in response, the monitoring module 102 tracks the proximate web activities of User C (202). Assume that the analysis module 103 determines that the questions in the collaboration meeting pertain to Topic A (203), and determines the navigation path of User C (204) to be the following:

User C navigation path: ibm.biz/BwerxDz62255Y

Assume that the analysis module 103 calculates a semantic score of "56" for the navigation path of User C (205). This semantic score of "56" is associated with User C, Topic A, and User C navigation path, and stored in the expertise database 104 (206). The analysis module 103 then calculates a threshold score for Topic A using a sampling of semantic scores associated with topics matching Topic A in the expertise database 104 (207). Assume that this sampling includes the semantic scores of User A and User B, and the threshold score for Topic A is calculated to be "71". The threshold score of "71" thus represents the level at which a user is considered to be an expert in Topic A. User A and User B are thus both considered to the experts in Topic A, while User C is not (208). Since the User C's semantic score does not meet the threshold score, then one or more predetermined actions are taken (209), such as suggesting that User C contact either User A or User B.

As described above, embodiments of the present invention provide an efficient manner of automatically (without user intervention) discovering navigation paths used by experts in specific topics, thus requiring less computing time and resources. The embodiments of the present invention facilitate other users, who issue queries on these specific topics, learning from the navigation paths used by the experts.

Figure 3:
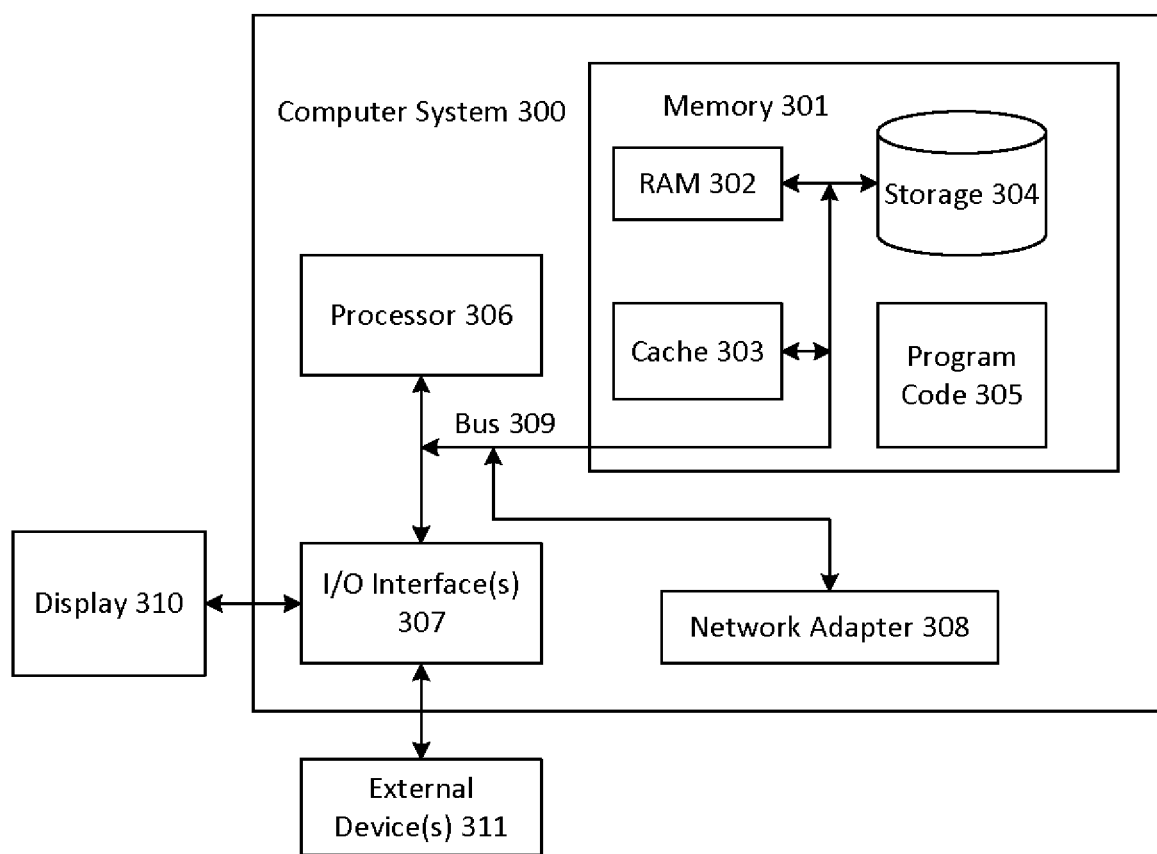
FIG. 3 illustrates a computer system which may be implemented as the computing device or the client computing devices according to embodiments of the present invention.

FIG. 3 illustrates a computer system which may be implemented as the computing device 101 or the client computing devices 105-107 according to embodiments of the present invention. The computer system 300 is operationally coupled to a processor or processing units 306, a memory 301, and a bus 309 that couples various system components, including the memory 301 to the processor 306. The bus 309 represents one or more of any of several types of bus structure, including a memory bus or memory controller, a peripheral bus, an accelerated graphics port, and a processor or local bus using any of a variety of bus architectures. The memory 301 may include computer readable media in the form of volatile memory, such as random access memory (RAM) 302 or cache memory 303, or non-volatile storage media 304. The memory 301 may include at least one program product having a set of at least one program code module 305 that are configured to carry out the functions of embodiment of the present invention when executed by the processor 306. The computer system 300 may also communicate with one or more external devices 311, such as a display 310, via I/O interfaces 307. The computer system 100 may communicate with one or more networks via network adapter 308.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for expert discovery using user query navigation paths, comprising:
    intercepting, by a computing device, a query submitted to a web server by a user;
    in response to the interception of the query, triggering a tracking, by the computing device, of web activities by the user, the web activities comprising an order of webpages visited by the user after submission of the query;
    determining, by the computing device, a topic of the query;
    associating with the user, by the computing device, a navigation path comprising the web activities;
    calculating, by the computing device, a semantic score for the navigation path associated with the user using a cognitive model, the semantic score for the navigation path associated with the user representing a level of expertise of the user in the topic, the cognitive model previously trained with a dataset from an expertise database comprising semantic scores for navigation paths associated with known experts in the topic;
    calculating, by the computing device, a threshold score for the topic using a sampling of the semantic scores for the navigation paths associated with the known experts in the topic in the expertise database, the threshold score representing a level of expertise above which a particular user is considered to be an expert in the topic;
    determining, by the computing device, whether the semantic score for the navigation path associated with the user meets the threshold score for the topic; and
    when the semantic score for the navigation path associated with the user does not meet the threshold score for the topic, performing one or more predetermined actions.

2. The method of claim 1, wherein the calculating of the semantic score for the navigation path associated with the user using the cognitive model comprises: processing, by the cognitive model, one or more of the following parameters:
    an expertise of the user derived from a plurality of sources, wherein the semantic score for the navigation path associated with the user is adjusted when the user is determined to be an expert in the topic;
    a number of steps in the navigation path associated with the user;
    a relevancy of contents of one or more webpages in the navigation path associated with the user;
    ranking of the webpages in the navigation path associated with the user according to levels of relevancy to the topic;
    the user's interactions with the webpages in the navigation path associated with the user; and
    an amount of time the user spends on the webpages in the navigation path associated with the user.

3. The method of claim 2, wherein the one or more parameters further comprises at least one follow-up query, wherein the method further comprises:
    after submission of the follow-up query, calculating a second semantic score for a second navigation path associated with the user using the cognitive model; and
    calculating a composite semantic score for the navigation path and the second navigation path associated with the user.

4. The method of claim 1, wherein the predetermined actions comprise one or more of the following:
    sending a message to the user to connect to another user determined to be an expert in the topic;
    sending one or more recommendations of webpages based on webpages in topic-relevant navigation paths in the expertise database; and
    sending one or more recommendations for modifications to the navigation path associated with the user based on differences with the topic-relevant navigation paths in the expertise database.

5. A computer program product for expert discovery using user query navigation paths, the computer program product comprising a computer readable storage medium having program instructions embodied therewith, the program instructions executable by a processor to cause the processor to:
    intercept a query submitted to a web server by a user;
    in response to the interception of the query, trigger a tracking of web activities by the user, the web activities comprising an order of webpages visited by the user after submission of the query;
    determine a topic of the query;
    associate with the user a navigation path comprising the web activities;
    calculate a semantic score for the navigation path associated with the user using a cognitive model, the semantic score for the navigation path associated with the user representing a level of expertise of the user in the topic, the cognitive model previously trained with a dataset from an expertise database comprising semantic scores for navigation paths associated with known experts in the topic;
    calculate a threshold score for the topic using a sampling of the semantic scores for the navigation paths associated with the known experts in the topic in the expertise database, the threshold score representing a level of expertise above which a particular user is considered to be an expert in the topic;
    determine whether the semantic score for the navigation path associated with the user meets the threshold score for the topic; and
    when the semantic score for the navigation path associated with the user does not meet the threshold score for the topic, perform one or more predetermined actions.

6. The computer program product of claim 5, wherein the calculating of the semantic score for the navigation path associated with the user using the cognitive model comprises: processing, by the cognitive model, one or more of the following parameters:
- an expertise of the user derived from a plurality of sources, wherein the semantic score for the navigation path associated with the user is adjusted when the user is determined to be an expert in the topic;
- a number of steps in the navigation path associated with the user;
- a relevancy of contents of one or more webpages in the navigation path associated with the user;
- ranking of the webpages in the navigation path associated with the user according to levels of relevancy to the topic;
- the user's interactions with the webpages in the navigation path associated with the user; and
- an amount of time the user spends on the webpages in the navigation path associated with the user.

7. The computer program product of claim 6, wherein the one or more parameters further comprises at least one follow-up query, wherein the processor is further caused to:
- after submission of the follow-up query, calculate a second semantic score for a second navigation path associated with the user using the cognitive model; and
- calculate a composite semantic score for the navigation path and the second navigation path associated with the user.

8. The computer program product of claim 5, wherein the predetermined actions comprise one or more of the following:
- sending a message to the user to connect to another user determined to be an expert in the topic;
- sending one or more recommendations of webpages based on webpages in topic-relevant navigation paths in the expertise database; and
- sending one or more recommendations for modifications to the navigation path associated with the user based on differences with the topic-relevant navigation paths in the expertise database.

9. A system comprising:
- a processor; and
- a non-transitory computer readable storage medium having program instructions embodied therewith, the program instructions executable by a processor to cause the processor to:
- intercept a query submitted to a web server by a user;
- in response to the interception of the query, trigger a tracking of web activities by the user, the web activities comprising an order of webpages visited by the user after submission of the query;
- determine a topic of the query;
- associate with the user a navigation path comprising the web activities;
- calculate a semantic score for the navigation path associated with the user using a cognitive model, the semantic score for the navigation path associated with the user representing a level of expertise of the user in the topic, the cognitive model previously trained with a dataset from an expertise database comprising semantic scores for navigation paths associated with known experts in the topic;
- calculate a threshold score for the topic using a sampling the semantic scores for the navigation paths associated with the known experts in the topic in the expertise database, the threshold score representing a level of expertise above which a particular user is considered to be an expert in the topic;
- determine whether the semantic score for the navigation path associated with the user meets the threshold score for the topic; and
- when the semantic score for the navigation path associated with the user does not meet the threshold score for the topic, perform one or more predetermined actions.

10. The system of claim 9, wherein the calculating of the semantic score for the navigation path associated with the user using the cognitive model comprises: processing, by the cognitive model, one or more of the following parameters:
- an expertise of the user derived from a plurality of sources, wherein the semantic score for the navigation path associated with the user is adjusted when the user is determined to be an expert in the topic;
- a number of steps in the navigation path associated with the user;
- a relevancy of contents of one or more webpages in the navigation path associated with the user;
- ranking of the webpages in the navigation path associated with the user according to levels of relevancy to the topic;
- the user's interactions with the webpages in the navigation path associated with the user; and
- an amount of time the user spends on the webpages in the navigation path associated with the user.

11. The system of claim 10, wherein the one or more parameters further comprises at least one follow-up query, wherein the processor is further caused to:
- after submission of the follow-up query, calculate a second semantic score for a second navigation path associated with the user using the cognitive model; and
- calculate a composite semantic score for the navigation path and the second navigation path associated with the user.

12. The system of claim 9, wherein the predetermined actions comprise one or more of the following:
- sending a message to the user to connect to another user determined to be an expert in the topic;
- sending one or more recommendations of webpages based on webpages in topic-relevant navigation paths in the expertise database; and
- sending one or more recommendations for modifications to the navigation path associated with the user based on differences with the topic-relevant navigation paths in the expertise database.

* * * * *